United States Patent
Shin et al.

(10) Patent No.: US 11,436,966 B2
(45) Date of Patent: Sep. 6, 2022

(54) DISPLAY APPARATUS AND VEHICLE DISPLAY APPARATUS INCLUDING THE SAME

(71) Applicant: LG Display Co., Ltd., Seoul (KR)

(72) Inventors: Hong Seop Shin, Uiwang-si (KR); Hyeok Jun Kwon, Soeul (KR); Chang Mo Yang, Seoul (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 17/366,909

(22) Filed: Jul. 2, 2021

(65) Prior Publication Data
US 2022/0028321 A1 Jan. 27, 2022

(30) Foreign Application Priority Data

Jul. 23, 2020 (KR) .................. 10-2020-0091511

(51) Int. Cl.
*G09G 3/20* (2006.01)
*B60K 37/02* (2006.01)

(52) U.S. Cl.
CPC .......... *G09G 3/2003* (2013.01); *B60K 37/02* (2013.01); *B60K 2370/1523* (2019.05); *B60K 2370/349* (2019.05); *G09G 2320/066* (2013.01); *G09G 2320/0626* (2013.01); *G09G 2320/0666* (2013.01); *G09G 2360/141* (2013.01); *G09G 2360/144* (2013.01)

(58) Field of Classification Search
CPC ..... G09G 2320/0626; G09G 2320/066; G09G 2320/0673; G09G 2320/0646; G09G 2340/06
See application file for complete search history.

(56) References Cited

U.S. PATENT DOCUMENTS

| | | | | |
|---|---|---|---|---|
| 2008/0100554 A1* | 5/2008 | Mori | .................... | G09G 3/3406 345/89 |
| 2012/0306947 A1* | 12/2012 | Kim | ..................... | G09G 3/3233 345/694 |
| 2020/0139815 A1* | 5/2020 | Hisatsugu | ............... | B60R 11/04 |

* cited by examiner

*Primary Examiner* — Dong Hui Liang
(74) *Attorney, Agent, or Firm* — Fenwick & West LLP

(57) ABSTRACT

The present disclosure provides a display apparatus including a display panel displaying an image, a driver driving the display panel, and a controller controlling the driver, wherein the controller converts an RGB data signal supplied from the outside into a YCbCr data signal, and performs image processing based on a gain determination graph having a horizontal asymmetric gain value with respect to a reference point, to enhance brightness of the YCbCr data signal.

10 Claims, 17 Drawing Sheets

FIG. 20

DISPLAY APPARATUS AND VEHICLE DISPLAY APPARATUS INCLUDING THE SAME

CROSS-REFERENCE TO RELATED APPLICATIONS

This application claims the benefit of Korean Patent Application No. 10-2020-0091511, filed on Jul. 23, 2020, which is hereby incorporated by reference as if fully set forth herein.

BACKGROUND

Field of the Technology

The present disclosure relates to a display apparatus and a vehicle display apparatus including the same.

Discussion of the Related Art

As information technology advances, the market for display apparatuses which are connection mediums connecting a user to information is growing. Therefore, the use of display apparatuses such as light emitting display apparatuses (LED), quantum dot display apparatuses (QDD), and liquid crystal display apparatuses (LCD) is increasing.

The display apparatuses described above include a display panel which includes a plurality of subpixels, a driver which outputs a driving signal for driving the display panel, and a power supply which supplies power to the display panel or the driver.

In such display apparatuses, when the driving signal (for example, a scan signal and a data signal) is supplied to each of the subpixels provided in the display panel, a selected subpixel may transmit light or may self-emit light, and thus, an image may be displayed.

SUMMARY

To overcome the aforementioned problem of the related art, the present disclosure may provide a display apparatus and a vehicle display apparatus including the same, which convert an RGB data signal into a brightness component (Y) and color component (Cb, Cr) data signal without image processing on the RGB data signal and enhance brightness, local contrast, colorfulness, and sharpness on the basis of a YCbCr data signal, thereby improving image expressivity (reproducibility).

To achieve these objects and other advantages and in accordance with the purpose of the disclosure, as embodied and broadly described herein, a display apparatus includes a display panel displaying an image, a driver driving the display panel, and a controller controlling the driver, wherein the controller converts an RGB data signal supplied from the outside into a YCbCr data signal, and performs image processing based on a gain determination graph having a horizontal asymmetric gain value with respect to a reference point, for enhancing brightness of the YCbCr data signal.

The reference point may be defined to have a high gain value in a part of a low gray level, and the horizontal asymmetric gain value may be defined to have a lower gain value than the gain value of the reference point.

The gain determination graph may have a gain value which progressively increases as a gray level increases, for enhancing low gray level expressivity and a contrast of an image in 20% or less of an average picture level, and may have a gain value which progressively decreases as a gray level increases, for minimizing a collection of high gray levels of an image and enhancing high gray level expressivity in 20% or more of the average picture level.

In the gain determination graph, a gain value for expressing the low gray level may be higher than a gain value for expressing the high gray level.

When brightness of a center pixel is brighter than the average brightness of a peripheral pixel in an average brightness component of N×M (where N and M is an integer of 3 or more) pixel blocks corresponding to the YCbCr data signal, the controller may increase the brightness of the center pixel, for enhancing a local contrast of the YCbCr data signal, and when the brightness of the center pixel is not brighter than the average brightness of the peripheral pixel in the average brightness component, the controller may decrease the brightness of the center pixel.

The controller may vary the weight of each color on the basis of that a saturation range for each hue differs, for enhancing colorfulness of a color component of the YCbCr data signal.

The controller may include a first converter converting the RGB data signal into the YCbCr data signal and a calculator calculating a brightness component and a color component in the YCbCr data signal and calculating a first average picture level and a second average picture level in the brightness component on the basis of different methods.

The controller may include a brightness enhancer enhancing the brightness of the YCbCr data signal on the basis of the second average picture level and a local contrast enhancer enhancing the local contrast of the YCbCr data signal on the basis of the brightness component and the first average picture level each output from the calculator and the brightness gain output from the brightness enhancer.

The controller may include a colorfulness enhancer enhancing a color component of the YCbCr data signal on the basis of an enhanced brightness component output from the local contrast enhancer and the color component output from the calculator and a second converter combining the enhanced brightness component, output from the local contrast enhancer, with an enhanced color component output from the colorfulness enhancer and converting a YCbCr data signal format into an RGB data signal format to output a converted signal.

The controller may further include an illuminance determiner determining whether external light is higher than preset illuminance, on the basis of a sensing value transferred from an illuminance sensor, wherein, when the sensing value is greater than or equal to an internal set value, the illuminance determiner may operate the first converter.

In another aspect of the present disclosure, a vehicle display apparatus includes a display apparatus including a display panel displaying an image, a driver driving the display panel, and a controller controlling the driver and an illuminance sensor sensing external light outside a vehicle, wherein, when a sensing value transferred from the illuminance sensor is greater than or equal to an internal set value, the controller converts an RGB data signal supplied from the outside into a YCbCr data signal, and performs image processing on the basis of a gain determination graph having a gain value which is horizontally asymmetric with respect to a reference point, for enhancing brightness of the YCbCr data signal.

The gain determination graph may have a gain value which progressively increases as a gray level increases, for enhancing low gray level expressivity and a contrast of an image in 20% or less of an average picture level, and may have a gain value which progressively decreases as a gray level increases, for minimizing a collection of high gray levels of an image and enhancing high gray level expressivity in 20% or more of the average picture level.

BRIEF DESCRIPTION OF THE DRAWINGS

The accompanying drawings, which are included to provide a further understanding of the disclosure and are incorporated in and constitute a part of this application, illustrate embodiment(s) of the disclosure and together with the description serve to explain the principle of the disclosure. In the drawings:

FIG. 20 is a diagram showing expressivity in a comparative example and an embodiment after image processing is performed on an original image.

DETAILED DESCRIPTION OF THE DISCLOSURE

Hereinafter, the present disclosure will be described more fully with reference to the accompanying drawings, in which exemplary embodiments of the disclosure are shown. The disclosure may, however, be embodied in many different forms and should not be construed as being limited to the embodiments set forth herein; rather, these embodiments are provided so that this disclosure will be thorough and complete, and will fully convey the concept of the disclosure to those skilled in the art.

A display apparatus according to the present disclosure may be applied to televisions (TVs), video players, personal computers (PCs), home theaters, electronic devices for vehicles, and smartphones, but is not limited thereto. The display apparatus according to the present disclosure may be implemented as a light emitting display apparatus, a quantum dot display (QDD) apparatus, a liquid crystal display (LCD) apparatus, or the like.

Hereinafter, however, for convenience of description, a light emitting display apparatus which self-emits light to display an image will be described example. A light emitting display apparatus may be implemented based on an inorganic light emitting diode or an organic light emitting diode. Hereinafter, however, for convenience of description, an example where a light emitting display apparatus is implemented based on an organic light emitting diode will be described.

Figure 1:
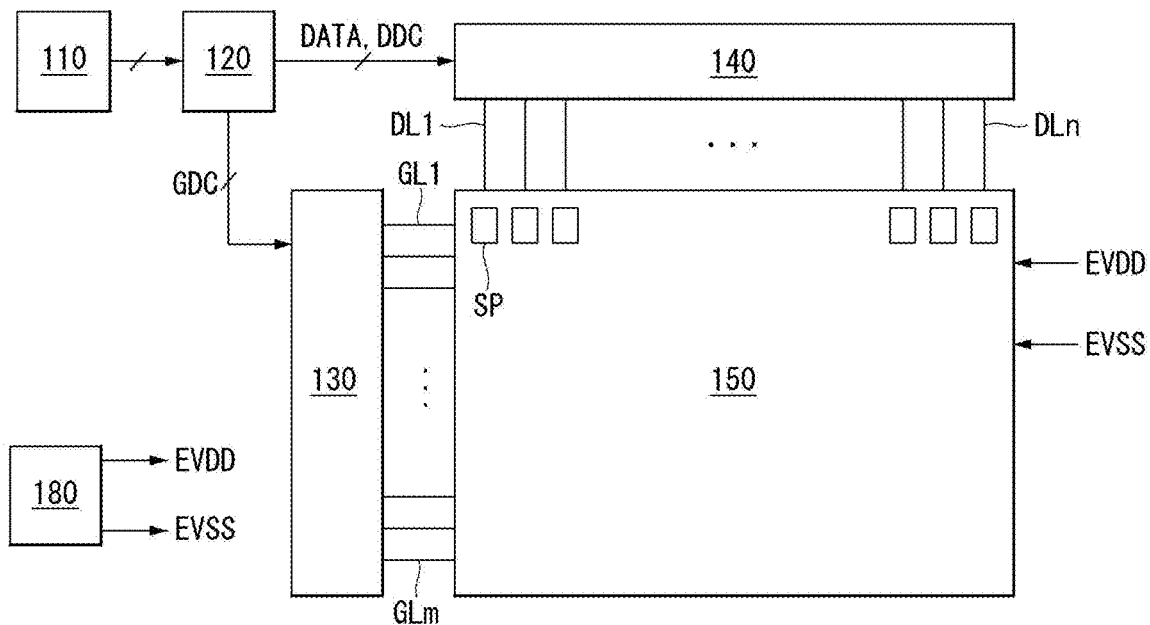
FIG. 1 is a block diagram schematically illustrating a light emitting display apparatus according to an embodiment of the present disclosure.
Figure 2:
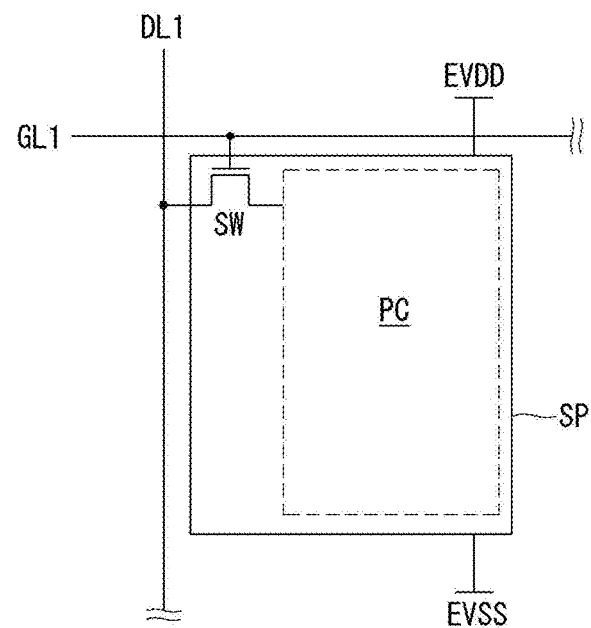
FIG. 2 is a configuration diagram schematically illustrating a subpixel illustrated in FIG. 1.

FIG. 1 is a block diagram schematically illustrating a light emitting display apparatus according to an embodiment of the present disclosure, and FIG. 2 is a configuration diagram schematically illustrating a subpixel illustrated in FIG. 1.

As illustrated in FIGS. 1 and 2, the light emitting display apparatus according to an embodiment of the present disclosure may include a video supply unit 110, a timing controller 120, a scan driver 130, a data driver 140, a display panel 150, and a power supply 180.

The video supply unit 110 (or a host system) may output a video data signal supplied from the outside or a video data signal and various driving signals stored in an internal memory thereof. The video supply unit 110 may supply a data signal and the various driving signals to the timing controller 120.

The timing controller 120 may output a gate timing control signal GDC for controlling an operation timing of the scan driver 130, a data timing control signal DDC for controlling an operation timing of the data driver 140, and various synchronization signals (for example, a vertical synchronization signal Vsync and a horizontal synchronization signal Hsync).

The timing controller 120 may provide the data driver 140 with the data timing control signal DDC and a data signal DATA supplied from the video supply unit 110. The timing controller 120 may be implemented as an integrated circuit (IC) type and may be mounted on a printed circuit board (PCB), but is not limited thereto.

The scan driver 130 may output a scan signal (or a scan voltage) in response to the gate timing control signal GDC supplied from the timing controller 120. The scan driver 130 may supply the scan signal to a plurality of subpixels, included in the display panel 150, through a plurality of scan lines GL1 to GLm. The scan driver 130 may be implemented as an IC type or may be directly provided on the display panel 150 in a gate-in panel (GIP) type, but is not limited thereto.

In response to the data timing control signal DDC supplied from the timing controller 120, the data driver 140 may sample and latch the data signal DATA, convert a digital data signal into an analog data voltage on the basis of a gamma reference voltage, and output the analog data voltage.

The data driver 140 may respectively supply data voltages to the subpixels of the display panel 150 through a plurality of data lines DL1 to DLn. The data driver 140 may be implemented as an IC type or may be mounted on the display panel 150 or a PCB, but is not limited thereto.

The power supply 180 may generate and output a first panel power EVDD having a high level and a second panel power EVSS having a low level on the basis of an external input voltage supplied from the outside. The power supply unit 180 may generate and output a voltage (for example, a scan high voltage and a scan low voltage) needed for driving of the scan driver 130 or a voltage (for example, a drain voltage and a half drain voltage) needed for driving of the data driver 140, in addition to the first panel power EVDD and the second panel power EVSS.

The display panel 150 may display an image on the basis of a driving signal, including the scan signal and a data voltage respectively output from the scan driver 130 and the data driver 140, and the first panel power EVDD and the second panel power EVSS each output from the power supply 180. The subpixels of the display panel 150 may each self-emit light.

The display panel 150 may be manufactured based on a substrate, having stiffness or flexibility, such as glass, silicon, or polyimide. Also, the subpixels emitting light may include pixels including red, green, and blue, or may include pixels including red, green, blue, and white, but are not limited thereto.

For example, one subpixel SP may include a pixel circuit PC which includes a switching transistor, a driving transistor, a storage capacitor, and an organic light emitting diode. The subpixel SP applied to the light emitting display apparatus may self-emit light, and thus, may be complicated in circuit configuration. Also, the subpixel SP may further include various circuits such as a compensation circuit which compensates for a degradation in the organic light emitting diode emitting light and a degradation in the driving transistor supplying a driving current to the organic light emitting diode. Accordingly, it may be assumed that the pixel circuit PC included in the subpixel SP is simply illustrated in a block form.

Hereinabove, each of the timing controller 120, the scan driver 130, and the data driver 140 has been described as an individual element. However, based on an implementation type of the light emitting display apparatus, one or more of the timing controller 120, the scan driver 130, and the data driver 140 may be integrated into one IC.

Figure 3:
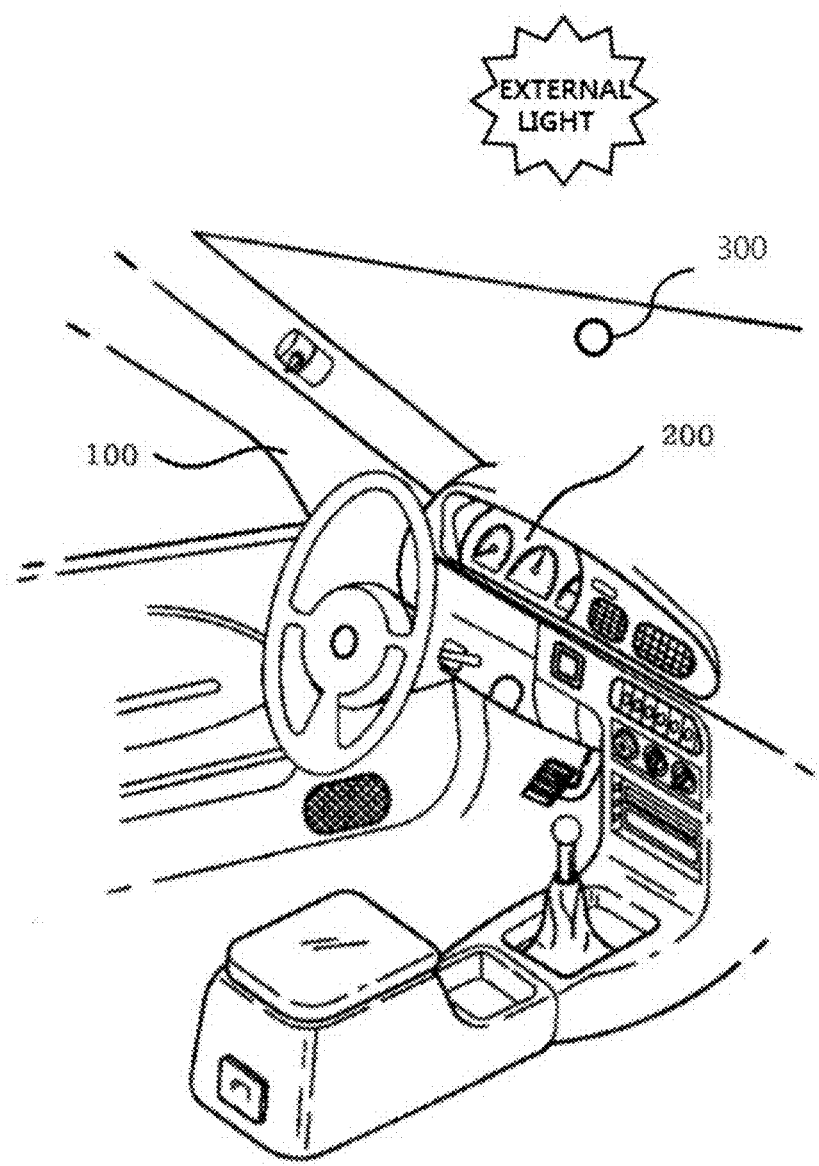
FIG. 3 is an exemplary diagram illustrating a vehicle including a vehicle display apparatus.
Figure 4A:
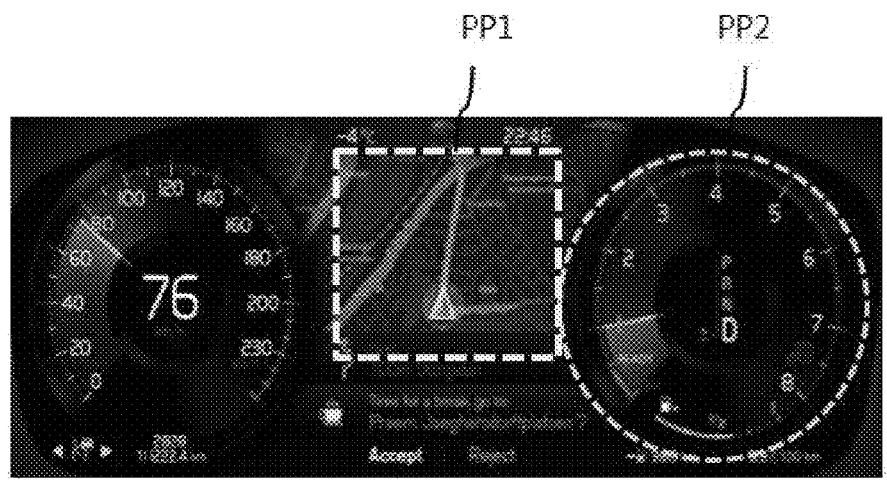
FIGS. 4A and 4B are diagrams illustrating the vehicle display apparatus illustrated in FIG. 3.
Figure 4B:
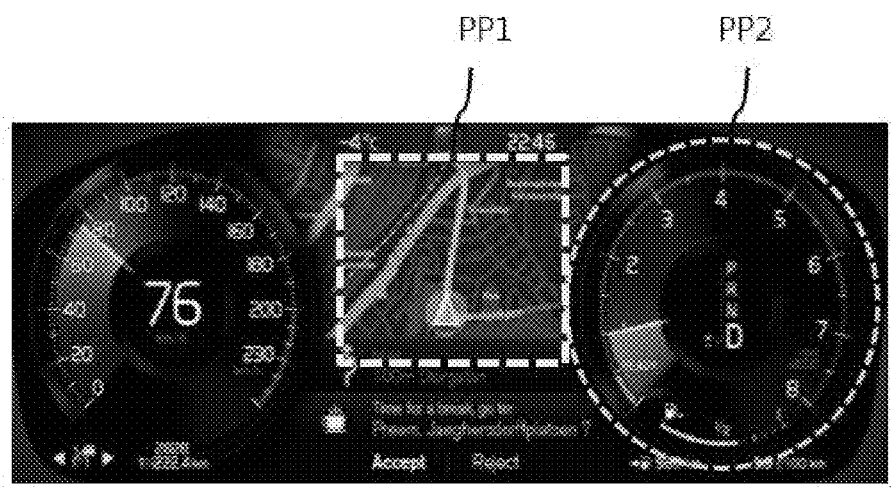

FIG. 3 is an exemplary diagram illustrating a vehicle including a vehicle display apparatus, and FIGS. 4A and 4B are diagrams illustrating the vehicle display apparatus illustrated in FIG. 3.

As illustrated in FIG. 3, the display apparatus of FIG. 1 may be installed in a vehicle 100. The display apparatus installed in the vehicle 100 may be referred to as a vehicle display apparatus 200. The vehicle display apparatus 200 may be implemented as various types such as infotainment, in addition to a dashboard of the vehicle 100.

The vehicle display apparatus 200 may cooperate with an illuminance sensor 300 which senses external light outside the vehicle 100. When the vehicle display apparatus 200 cooperates with the illuminance sensor 300, outdoor visibility may be more enhanced in a high illuminance environment. For example, the vehicle display apparatus 200 may cooperate with the illuminance sensor 300, and when a sensing value is greater than or equal to certain illuminance, outdoor visibility may be enhanced for image processing such as enhancing brightness, enhancing contrast, or enhancing colorfulness.

An example associated with image processing for enhancing the outdoor visibility of the vehicle display apparatus 200 may be referred to. In PP1 of FIG. 4A, like PP1 of FIG. 4B, contrast may be enhanced based on a high illuminance environment. In PP2 of FIG. 4A, like PP2 of FIG. 4B, a color may be enhanced based on a high illuminance environment.

Figure 5:
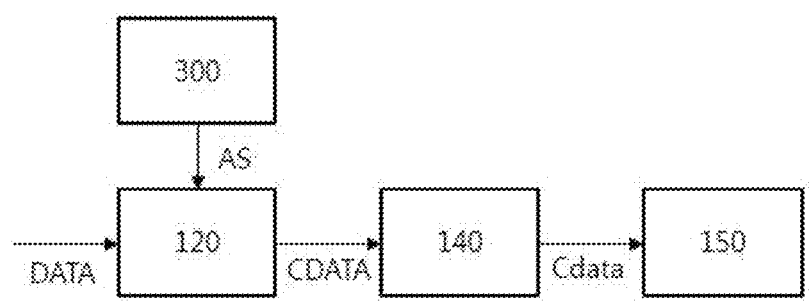
FIG. 5 is a diagram for describing main elements of a vehicle display apparatus according to an embodiment of the present disclosure.
Figure 6:
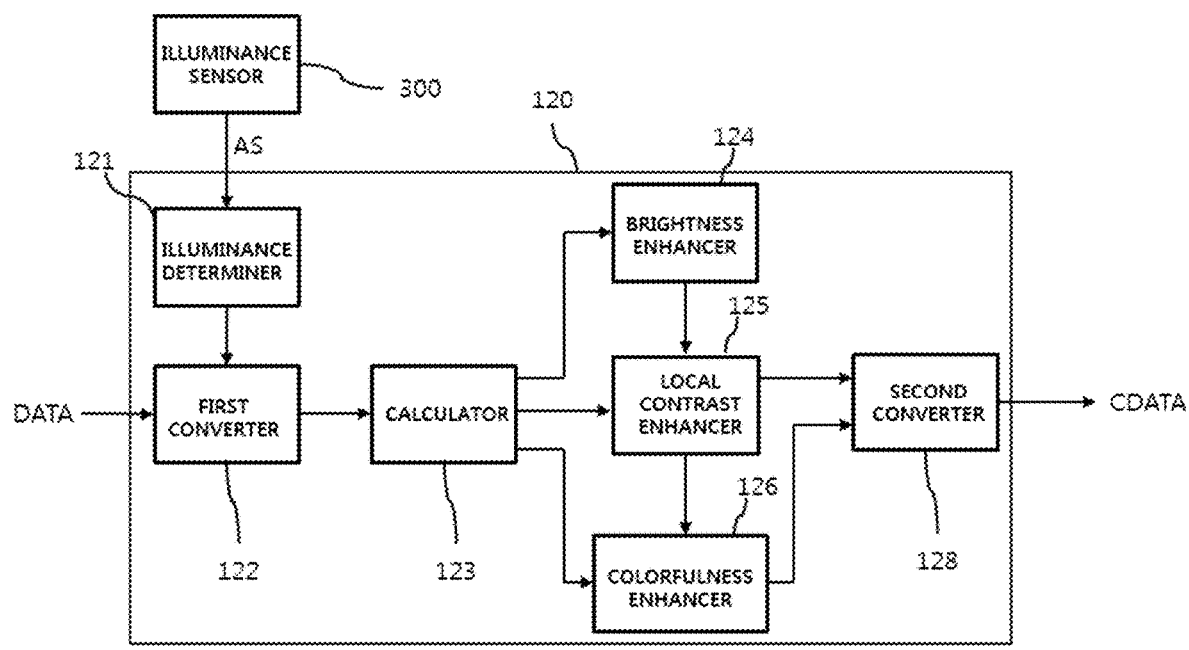
FIG. 6 is a diagram for describing a detailed configuration of a timing controller illustrated in FIG. 5.

FIG. 5 is a diagram for describing main elements of a vehicle display apparatus according to an embodiment of the present disclosure, and FIG. 6 is a diagram for describing a detailed configuration of a timing controller illustrated in FIG. 5.

As illustrated in FIG. 5, the vehicle display apparatus may include a timing controller 120, a data driver 140, a display panel 150, and an illuminance sensor 300. The timing controller 120 may perform image processing on a data signal DATA input from the outside on the basis of a sensing value AS output through the illuminance sensor 300 to output a compensation data signal CDATA. Also, the data driver 140 may convert a digital compensation data signal CDATA into an analog compensation data signal Cdata and may supply the analog compensation data signal Cdata to the display panel 150.

As illustrated in FIG. 6, the timing controller 120 may include an illuminance determiner 121, a first converter 122, a calculator 123, a brightness enhancer 124, a local contrast enhancer 125, a colorfulness enhancer 126, and a second converter 128.

The illuminance determiner 121 may determine whether external light outside a vehicle is higher than illuminance (certain illuminance) which is set in the vehicle. The illuminance determiner 121 may compare an internal set value with the sensing value AS output through the illuminance sensor 300, and when the sensing value AS is greater than or equal to the illuminance (certain illuminance) which is set in the vehicle, the first converter may output a first conversion control signal for operating (controlling) the first converter.

The first converter 122 may convert a red, green, and blue (RGB) data signal DATA, input from the outside, into a YCbCr (where Y is a brightness component and CbCr is a color component) data signal. The first converter 122 may convert the RGB data signal DATA into the YCbCr data signal on the basis of the first conversion control signal output from the illuminance determiner 121 and may output the YCbCr data signal.

The calculator 123 may calculate an average picture level APL of the YCbCr data signal output from the first converter 122. The calculator 123 may calculate the first average picture level and the second average picture level in a brightness component Y on the basis of two different calculation schemes. This will be described below.

The brightness enhancer 124 may enhance the brightness of an input data signal. The brightness enhancer 124 may calculate a brightness gain on the basis of the second average picture level and the brightness component Y output from the calculator 123 so as to enhance brightness.

The local contrast enhancer 125 may enhance the local contrast of the input data signal. The local contrast enhancer 125 may calculate a local contrast gain on the basis of the first average picture level and the brightness component Y output from the calculator 123 and a brightness gain output from the brightness enhancer 124 so as to enhance local contrast.

The colorfulness enhancer 126 may enhance the colorfulness of the input data signal. The colorfulness enhancer 126 may enhance a colorfulness gain on the basis of brightness output from the local contrast enhancer 125 and a color component CbCr output from the calculator 123 so as to enhance colorfulness.

The second converter 128 may classify the brightness component Y and the color component CbCr and may convert a YCbCr format, converted for image processing, into an RGB (red, green, and blue) format which is input again, thereby outputting a compensation data signal CDATA. An element for converting the YCbCr format into the RGB format may be generally used in the related art, and thus, its detailed description is omitted.

In the present embodiment, each of the first converter 122 and the calculator 123 is illustrated and described as separate blocks, but the first converter 122 and the calculator 123 may be integrated as one block. In the following description, therefore, an example where the first converter 122 and the calculator 123 are integrated as one block and thus only the calculator 123 is provided will be described.

Figure 7:
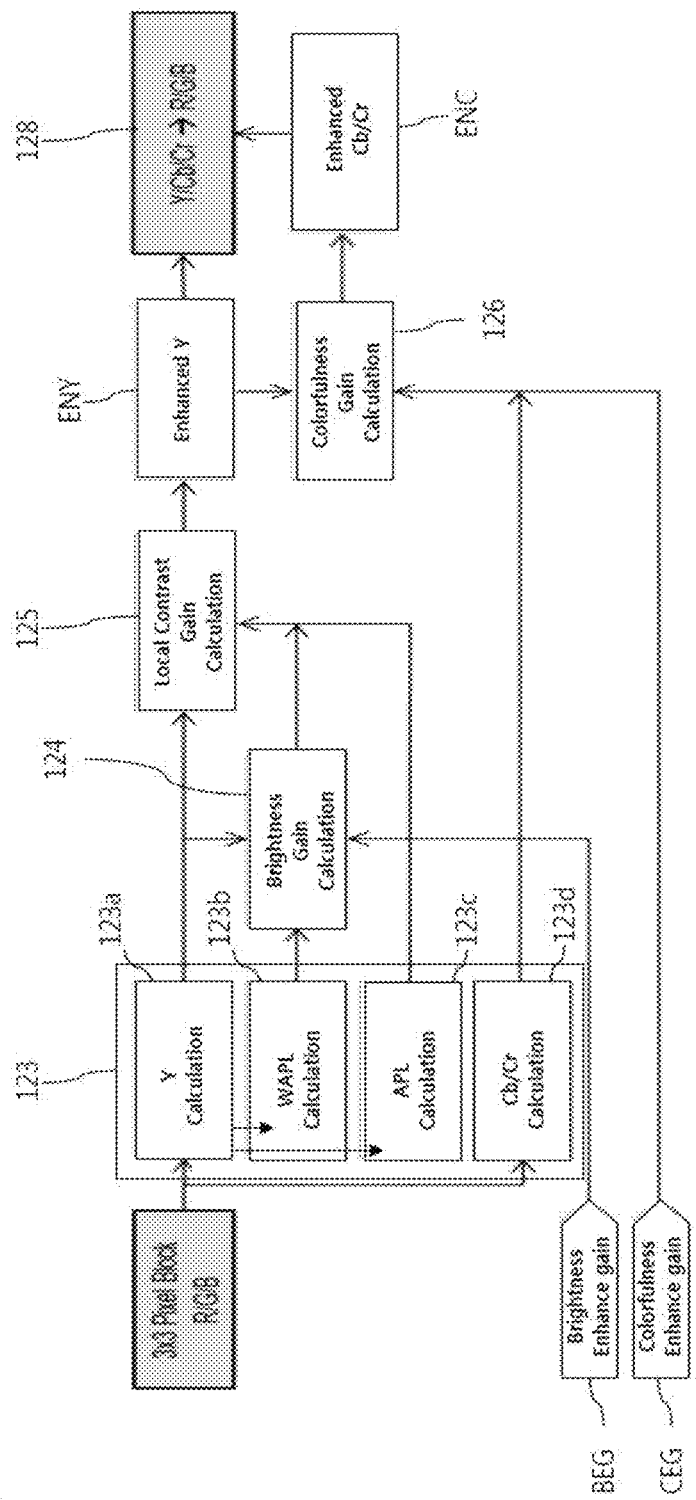
FIG. 7 is a diagram for describing in detail operations of elements illustrated in FIG. 6.

FIG. 7 is a diagram for describing in detail operations of elements illustrated in FIG. 6, and FIGS. 8, 9A, 9B, and 10 to 16 are diagrams for helping understand a brightness enhancer, a local contract enhancer, and a saturation enhancer.

As illustrated in FIG. 7, a calculator 123 may include a first calculator 123a, a second calculator 123b, a third calculator 123c, and a fourth calculator 123d. Hereinafter, in order to classifying two different average picture levels, the first average picture level may be represented by APL, and the second average picture level may be represented by WAPL.

The first calculator 123a may perform an operation of extracting a brightness component Y in an RGB data signal input from the outside. The second calculator 123b may perform an operation of extracting the second average picture level WAPL in the brightness component Y output from the first calculator 123a. The third calculator 123c may perform an operation of extracting the first average picture level APL in the brightness component Y output from the first calculator 123a. The fourth calculator 123d may perform an operation of extracting a color component CbCr in the RGB data signal input from the outside.

The second calculator 123b may use the following Equation 1 so as to extract the second average picture level WAPL in the brightness component Y output from the first calculator 123a. Also, the second calculator 123b may calculate the second average picture level WAPL by 3×3 pixel block (3×3 Pixel Block) units with respect to R/G/B on the basis of the following Equation 1. Here, 3×3 pixel blocks may be merely an example, and this may be expressed as N×M (where N is an integer of 3 or more and M is an integer of 3 or more) pixel blocks.

$$WAPL = \frac{\Sigma \, gray^2}{\Sigma \, gray} \qquad \text{[Equation 1]}$$

Equation 1 may be defined as the square of the first average picture level APL for calculating weight average brightness information in an input RGB data signal. When the second average picture level WAPL is calculated through the square of the first average picture level APL, the expressivity of a dark image may be enhanced (associated with brightness compensation) in image processing.

In addition, as described above, when the input RGB data signal is converted into the brightness component Y and the color component CbCr by using a plurality of independent calculators 123, an optical gain of each of the brightness component Y and the color component CbCr may be easily calculated.

The brightness enhancer 124 may calculate a brightness gain for differentially applying a pixel-based gain on the basis of a second average picture level WAPL characteristic and a gray level of an input data signal by 3×3 pixel block (3×3 Pixel Block) units so as to enhance brightness.

Figure 8:
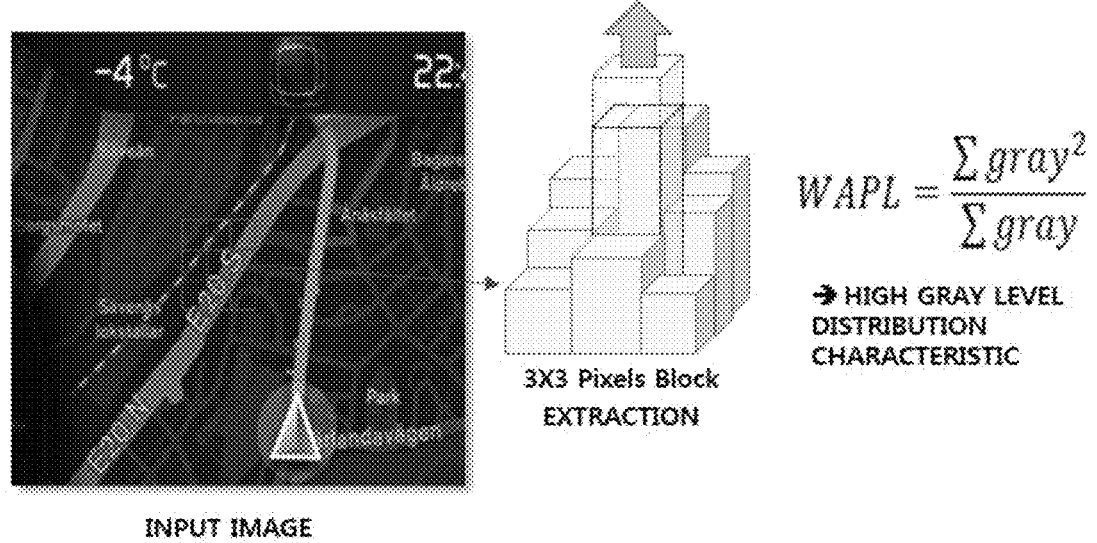
FIGS. 8, 9A, 9B, and 10 to 16 are diagrams for helping understand a brightness enhancer, a local contract enhancer, and a saturation enhancer.

Referring to FIGS. 7 and 8, the second calculator 123b may extract 3×3 pixel blocks (3×3 Pixel Block) and may perform an arithmetic operation on the second average picture level WAPL to provide a calculated value to the brightness enhancer 124, in order to determine a high gray level distribution characteristic thereof.

The brightness enhancer 124 may calculate a brightness gain for applying a gain of an input gray level based on the second average picture level WAPL by using the following Equation 2.

$$Y' = Gain \times Y$$

$$Gain = 1 + local\ gain \times pixel\ gain \qquad \text{[Equation 2]}$$

In Equation 2, the local gain may denote a local gain for applying a symmetric gain based on the second average picture level WAPL, and the pixel gain may be a pixel gain based on a corresponding pixel and may denote a weight which increases as darkness increases.

Figure 9A:
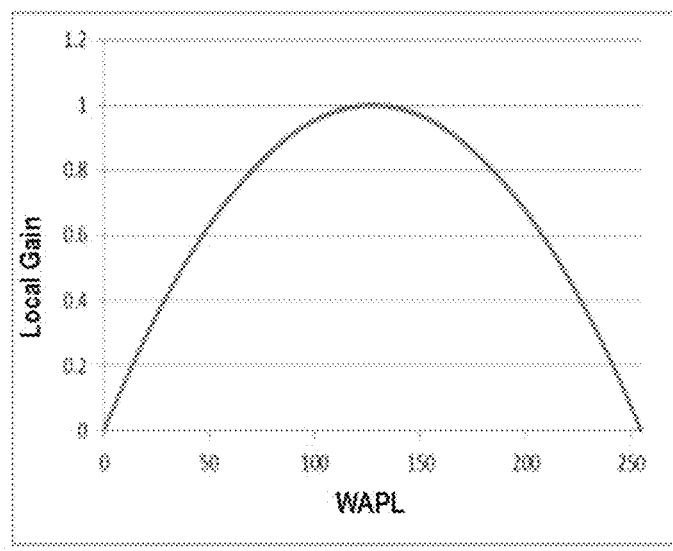

As in FIG. 9A, the local gain may have a graph shape where a center portion thereof protrudes up to a gain value "1" so that a left gain and a right gain are symmetric with each other. As seen in FIG. 9A, in a left region with respect to a gain value "1", a gain value may fall to a lowest gain level "0", and in a right region with respect to the gain value "1", a gain value may fall to a highest gain level "0". Also, falling curves of both regions may have similar/the same gain values so as to form a left-right symmetric shape and may fall.

Figure 9B:
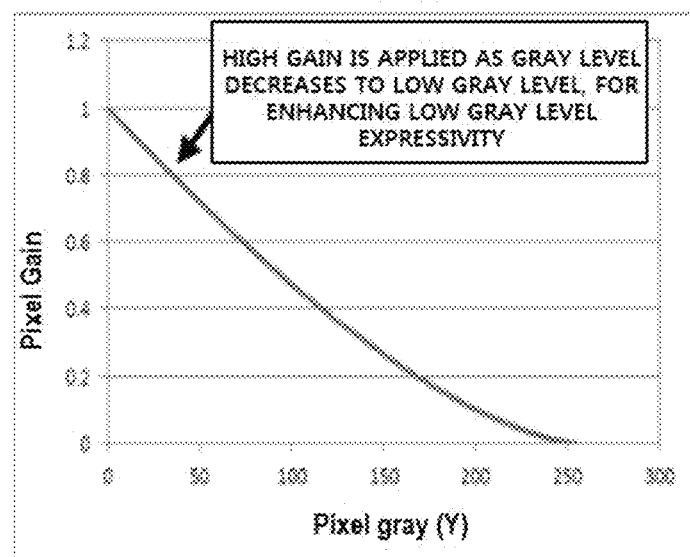

As in FIG. 9B, a pixel gain may have a graph shape which has a highest gain value "1" in a lowest gray level "0" and where a gain value falls toward a highest gray level "255". In a case where such a pixel gain is provided, a high gain may be applied as a gray level is lowered, and thus, low gray level expressivity may be enhanced.

Figure 10:
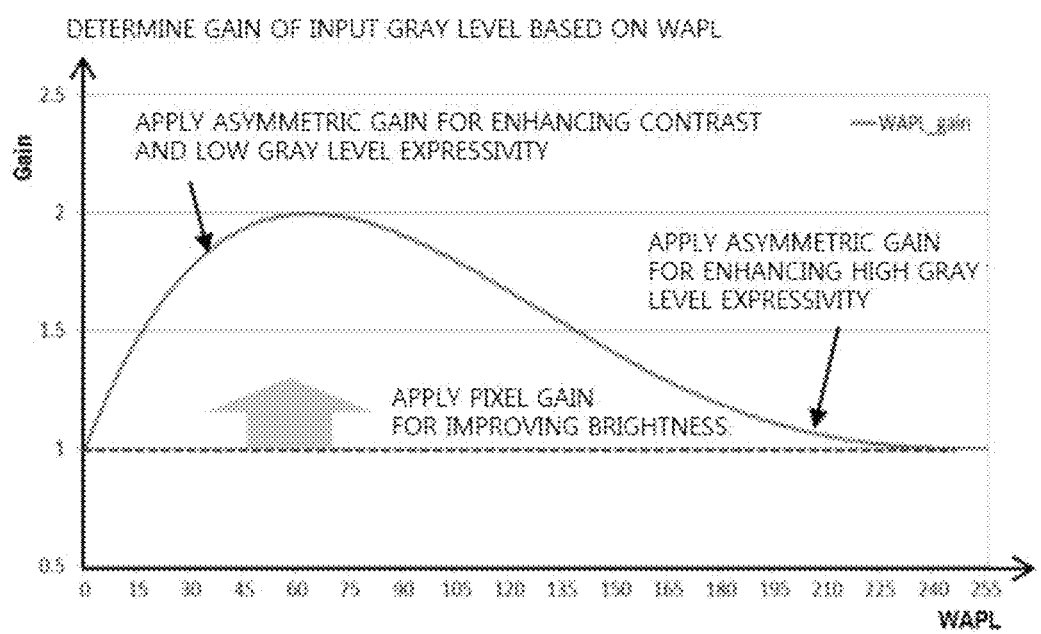

A gain determination graph of an input gray level based on the second average picture level WAPL illustrated in FIG. 10 may be provided based on the local gain of FIG. 9A and the pixel gain of FIG. 9B.

When the gain determination graph of FIG. 10 is provided based on FIG. 9A and FIG. 9B, the pixel gain for improving brightness may be applied, and an asymmetric gain for enhancing all of the expressivity of a low gray level and the expressivity of a high gray level may be applied.

Figure 11:
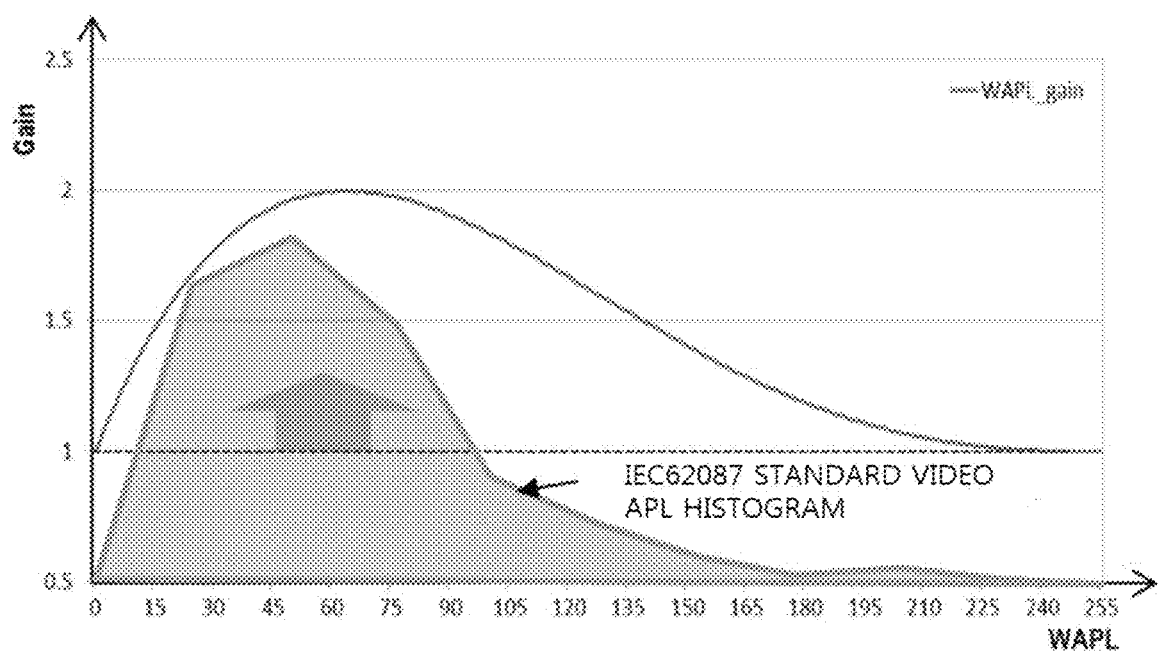

The gain determination graph of FIG. 10 may be implemented to realize a gain based on the second average picture level WAPL in a form similar to an average picture level histogram (APL Histogram) of IEC62087 standard video as in FIG. 11, for enhancing the brightness of an input image.

Referring to an average picture level histogram (APL Histogram) of IEC62087 standard video, it may be seen that a number of images are distributed with respect to an average picture level of about 20%. When a high gain is assigned to a region where the most images are distributed in standard video, brightness may be more enhanced. Accordingly, the gain determination graph of FIG. 10 may implement a gain based on the second average picture level WAPL in a form similar to the average picture level histogram (APL Histogram) of IEC62087 standard video.

As seen in FIGS. 10 and 11, the gain determination graph for enhancing brightness may be implemented so that about 20% portion, where an image distribution is high (in other words, a part of a low gray level), of the second average picture level WAPL is defined as a reference point having a high gain value, and the gain determination graph has a low gain value which is horizontally asymmetric with respect to the reference point.

According to the graph, in 20% or less, the graph may have a gain value which progressively increases as a gray level increases, for enhancing low gray level expressivity and a contrast of an image, and in 20% or more, the graph may have a gain value which progressively decreases as a gray level increases, for minimizing a collection of high gray levels of an image and enhancing high gray level expressivity. Also, according to the above graph, a gain value for expressing a low gray level may be higher than a gain value for expressing a high gray level.

Therefore, in the gain determination graph of FIG. 10, an average picture level histogram (APL Histogram) distribution of IEC62087 standard video may be referred to for assigning a high gain to a characteristic which is the most distributed in a characteristic of an input image, and a graph may be generated by combining the pixel gain and the local gain described in Equation 2 so as to obtain a gain having a similar form.

The local contrast enhancer 125 may calculate a local contrast gain for applying a pixel-based differential gain to average brightness on the basis of contrast and the brightness of a center pixel so as to enhance local contrast.

The local contrast enhancer 125 may output enhanced (or adjusted) brightness component ENY (Enhanced Y) on the basis of a local contrast gain. The sharpness of an image may be more enhanced based on the enhanced (or adjusted) brightness component ENY (Enhanced Y) output from the local contrast enhancer 125.

Figure 12:
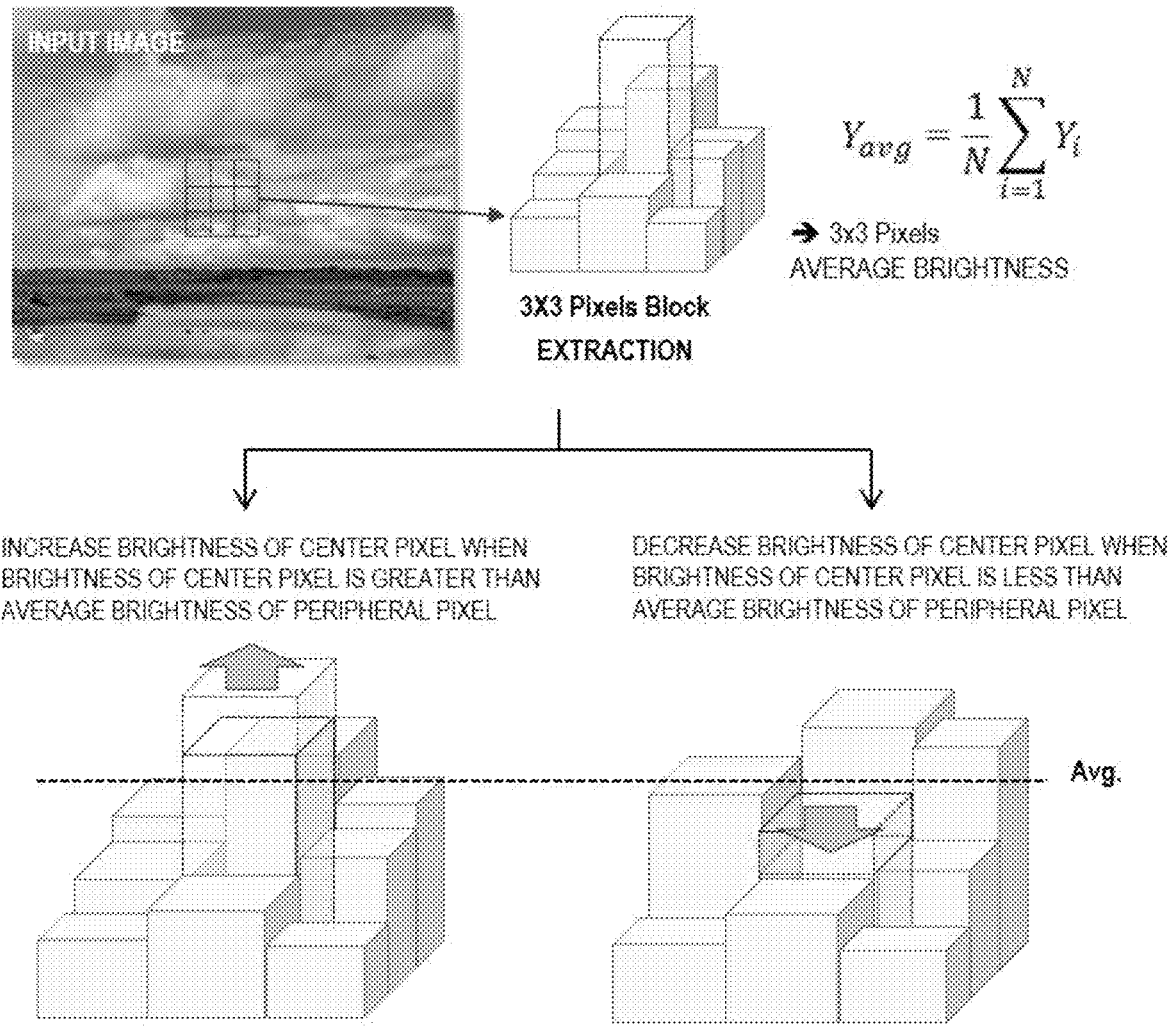

Referring to FIGS. 7 and 12, the first calculator 123a may extract 3×3 pixel blocks (3×3 Pixel Block), calculate a brightness component Y for determining average brightness thereof, and provide a calculated value to the local contrast enhancer 125.

$$Y_{avg} = \frac{1}{N}\sum_{i=1}^{N} Y_i \qquad \text{[Equation 3]}$$

The local contrast enhancer 125 may increase the brightness of a center pixel when the brightness of the center pixel is brighter than the average brightness of a peripheral pixel, in an average brightness component. When the brightness of the center pixel is not brighter than the average brightness of the peripheral pixel in the average brightness component, the local contrast enhancer 125 may reduce the brightness of the center pixel.

The local contrast enhancer 125 may calculate a local contrast gain $Gain_c$ for applying a pixel-based differential gain on the basis of Equation 4.

$$Y''=Y'+Gain_c$$

$$Gain_c=(Curr-Y_{avg})\times weight \qquad \text{[Equation 4]}$$

In Equation 4, Curr may denote a center pixel, Yavg may denote an average brightness (referred to as brightness) of a 3×3 region, and weight may denote a weight for compensating for a gain.

According to Equation 4, (1) when brightness of center pixel> average brightness and Gain>0, the brightness of the center pixel may increase, and (2) when brightness of center pixel<average brightness and Gain<0, the brightness of the center pixel may decrease.

The colorfulness enhancer 126 may prevent color saturation by applying a differential gain based on a brightness component Y of each color component CbCr so as to enhance colorfulness and may calculate a colorfulness gain to which a saturation gain for each color component CbCr is applicable.

The colorfulness enhancer 126 may output an enhanced (or adjusted) color component ENC (Enhanced Cb/Cr) on the basis of the colorfulness gain. The colorfulness of an image may be more enhanced based on the enhanced (or adjusted) color component ENC (Enhanced Cb/Cr) output from the colorfulness enhancer 126.

Figure 13:
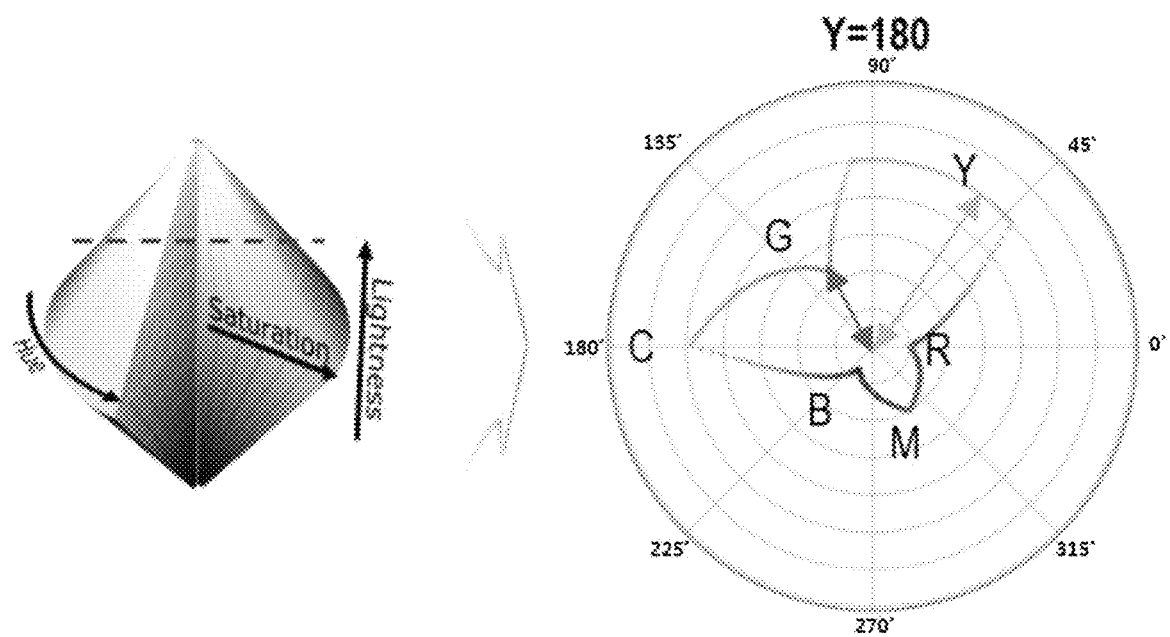

Referring to FIGS. 7 and 13, it may be seen that the reason that saturation gains of color components CbCr differ is because saturation ranges based on lightness and hue differ.

For example, a distance at which yellow (Y) reaches a saturation region may be longer than a distance at which cyan (C), green (G), magenta (M), red (R), or blue (B) reaches the saturation region. Also, distances at which cyan (C), green (G), magenta (M), red (R), and blue (B) reach the saturation region may decrease progressively in the order of cyan (C), green (G), magenta (M), red (R), and blue (B).

Figure 14:
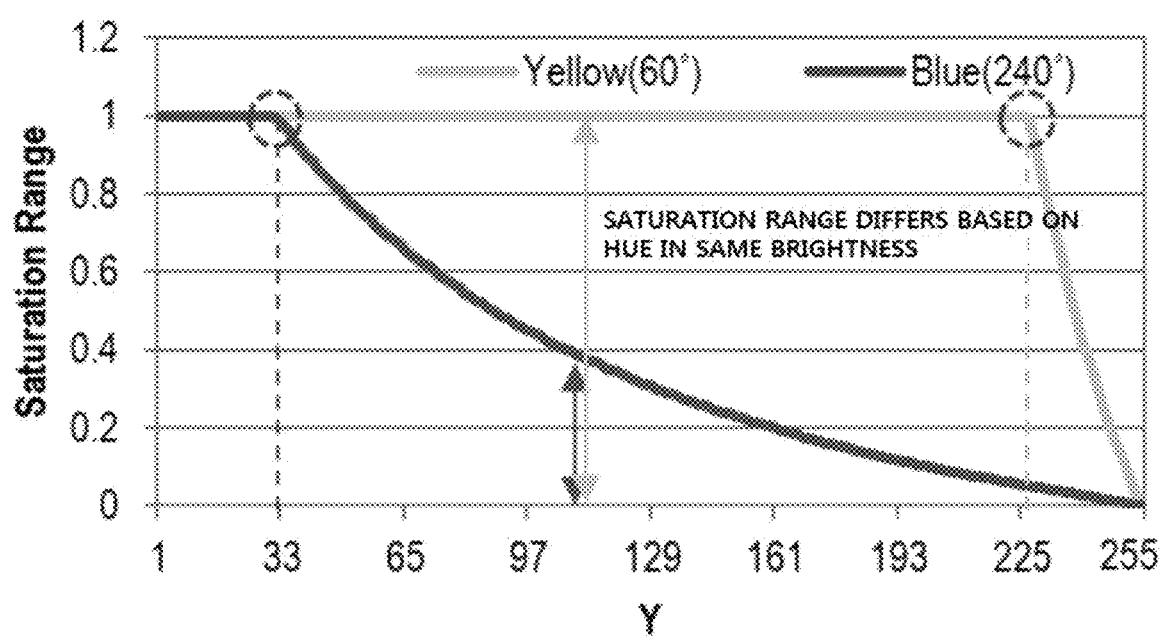

Referring to such a difference, as in FIG. 14, a brightness component Y where a saturation range starts to decrease may be constructed as data for each hue.

Referring to FIGS. 13 and 14, a saturation range may decrease as brightness increase, a saturation range based on brightness may differ for each color, and a saturation range may differ based on hue in the same brightness.

For example, a saturation range of blue may start to decrease from a time at which brightness Y is approximate 33, but a saturation range of yellow may start to decrease from a time at which brightness Y is approximate 255. In FIG. 14, in order to help understanding, only two samples such as yellow and blue are illustrated.

Hereinafter, a signal input/output process for helping understanding associated with colorfulness enhancement will be described with reference to FIG. 15.

Figure 15:
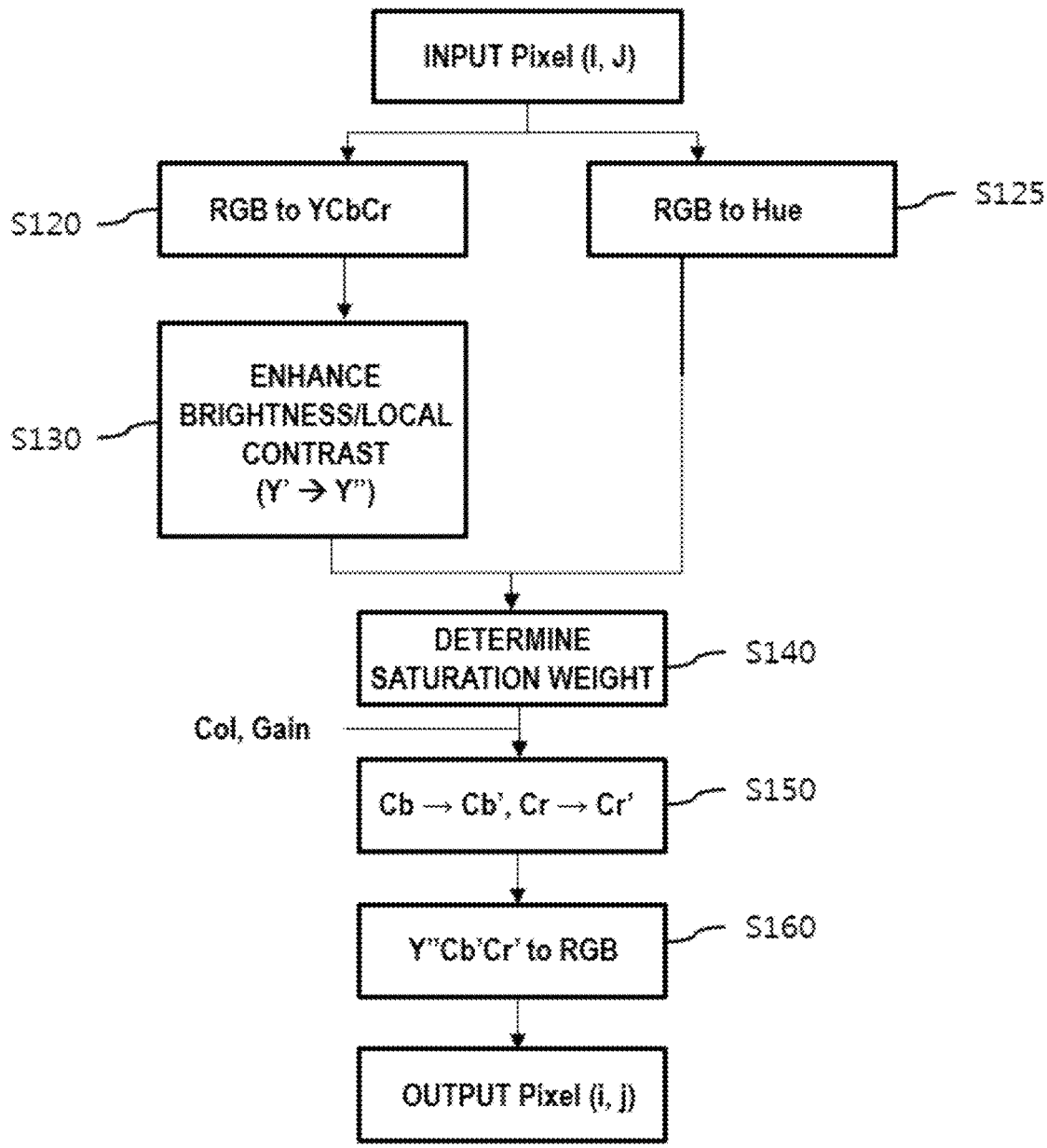
Figure 16:
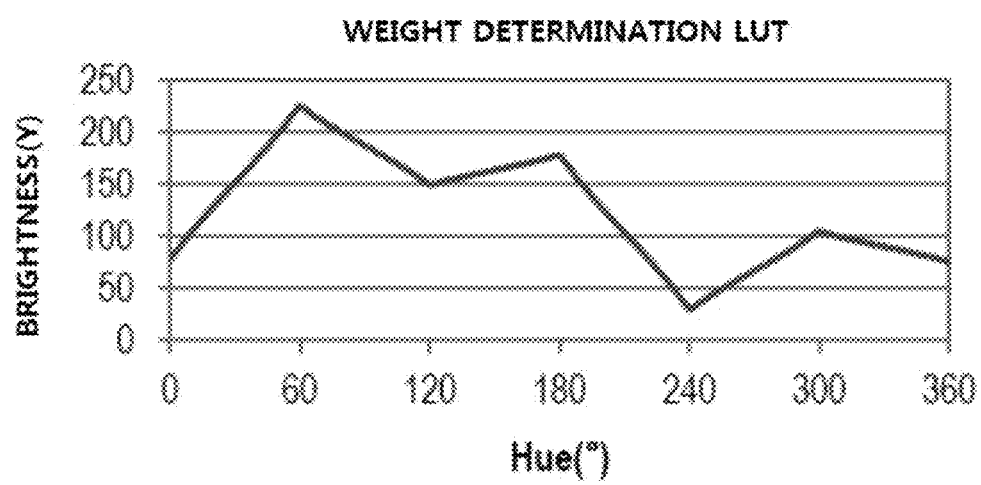

As illustrated in FIG. 15, an input pixel (Pixel (I, J)) may be changed from an RGB format to a YCbCr format (RGB to YCbCr) (S120), and may be changed from the RGB format to a hue format (RGB to Hue) (S125).

In YCbCr, a brightness component Y may be adjusted from a first brightness component Y' to a second brightness component Y" (Brightness/Local Contrast enhancement (Y'→Y")) through a brightness enhancement process and a local contrast enhancement process (S130).

A saturation weight for calculating a color component-based saturation gain may be determined based on the second brightness component Y" and a hue component H. In determining the saturation weight, the following processing method may be performed for decreasing a weight as a gray level increases to a high gray level.

if Y"<LUT(H)
    weight=1
    else
    weight=1−(Y"−LUT(H))/(255−LUT(H))

When the saturation weight is determined, a first color component may be adjusted to a $1^{st}$ color component (Cb→Cb') and a second color component may be adjusted to a $2^{nd}$ color component (Cr→Cr') (S150). In adjusting a color component, color-based gains Col and Gain may be separately (or additionally) applied from the outside, but the present disclosure is not limited thereto.

According to the above description, the $1^{st}$ color component may be defined as Cb'=Col_Gain×weight×Cb×Y"/Y, and the $2^{nd}$ color component may be defined as Cr'=Col_Gain×weight×Cr×Y"/Y. However, the present disclosure is not limited thereto.

An adjustment-completed brightness component and an adjustment-completed color component may be changed to the RGB format (Y"Cb'Cr' to RGB) and then may have the same format as an input pixel (Pixel (i, j)) format, but may be output in a corrected output pixel (Pixel (i, j)).

A lookup table for determining a weight of each of brightness and hue may be implemented based on the processing method described above, but an example thereof may be like FIG. 16. According to a weight determination lookup table (Weight determination LUT) of FIG. 16, a gain value may be calculated by varying a weight of each color on the basis of that a saturation range for each hue differs, and thus, colorfulness may be more enhanced.

Referring to FIGS. 7 to 16, the brightness enhancer 124 may calculate a brightness gain on the basis of the brightness component Y output from the first calculator 123a and the second average picture level WAPL output from the second calculator 123b, but may be additionally provided with a separate brightness enhancement gain BEG from the outside.

The colorfulness enhancer 126 may calculate a colorfulness gain on the basis of an enhanced (or adjusted) brightness component ENY (Enhanced Y) output from the local contrast enhancer 125 and a color component Cb/Cr output from the fourth calculator 123d, but may be additionally provided with a separate colorfulness enhancement gain CEG from the outside.

The second converter 128 may combine the enhanced (or adjusted) brightness component ENY (Enhanced Y), output from the local contrast enhancer 125, with an enhanced (or adjusted) color component ENC (Enhanced C) output from the colorfulness enhancer 126, and then, may change a YCbCr data signal to an RGB data signal format such as an original input.

Figure 17:
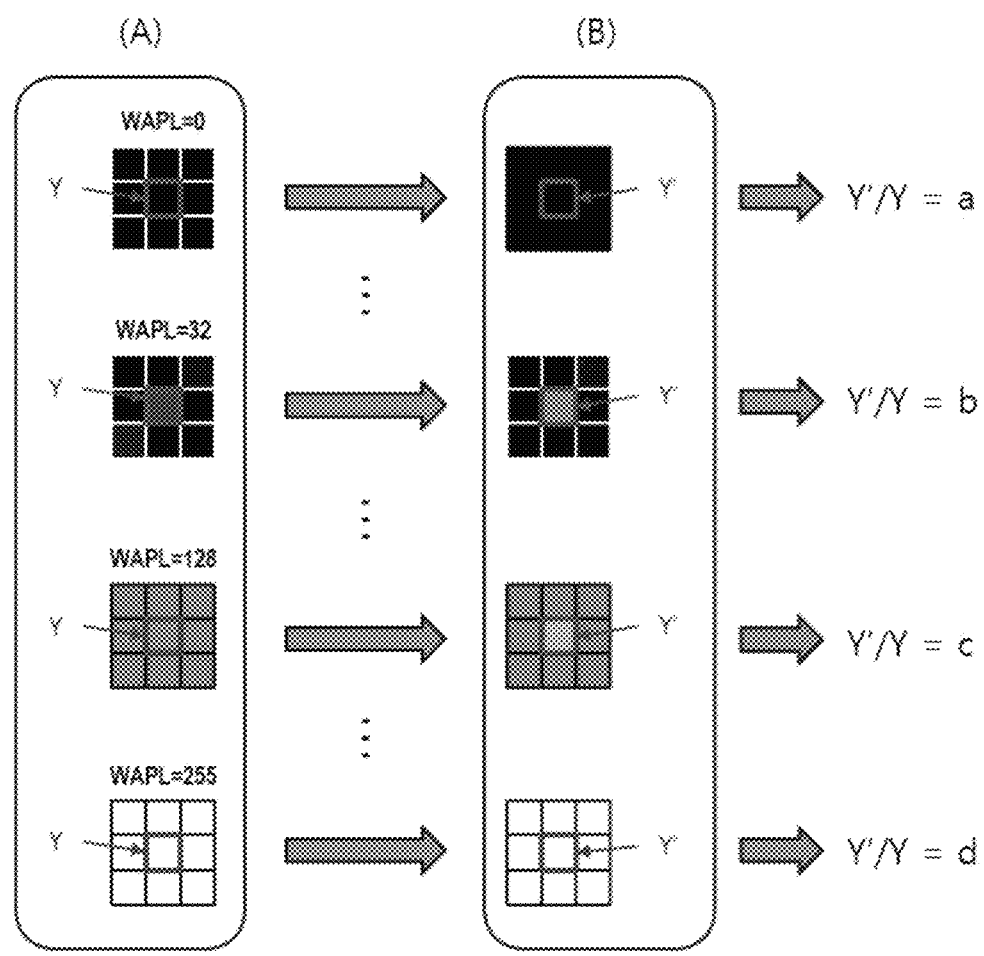
FIG. 17 is a diagram for describing a comparison of an operation before an embodiment is applied and an operation after an embodiment is applied.
Figure 18:
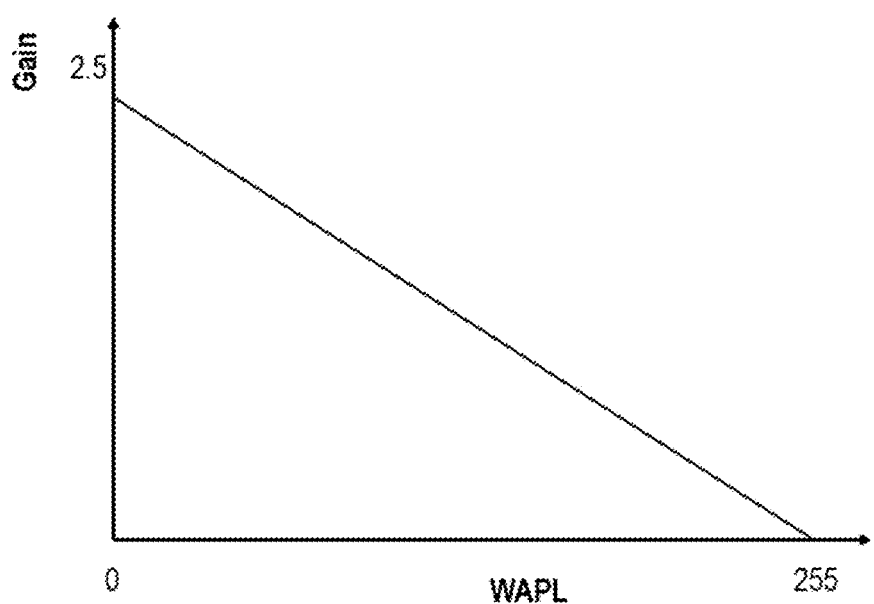
FIG. 18 is a diagram showing a variation of a gain corresponding to a second average picture level before an embodiment is applied.
Figure 19:
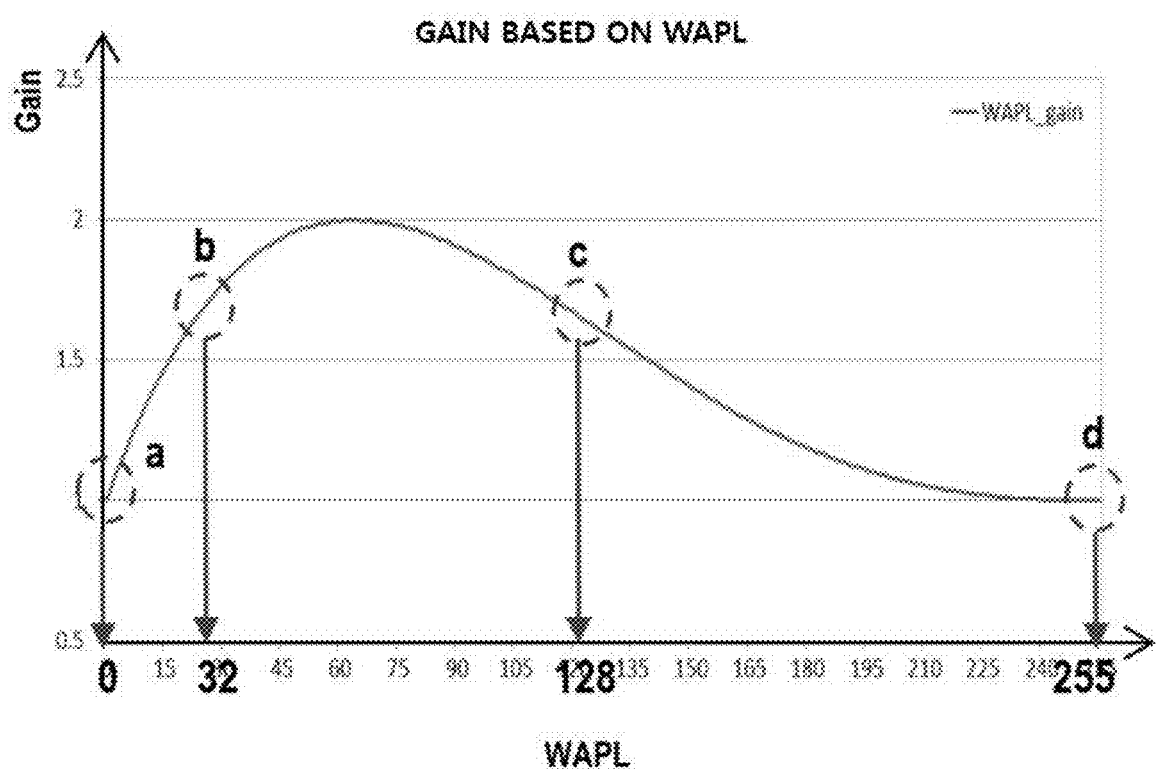
FIG. 19 is a diagram showing a variation of a gain corresponding to a second average picture level after an embodiment is applied.
Figure 20:
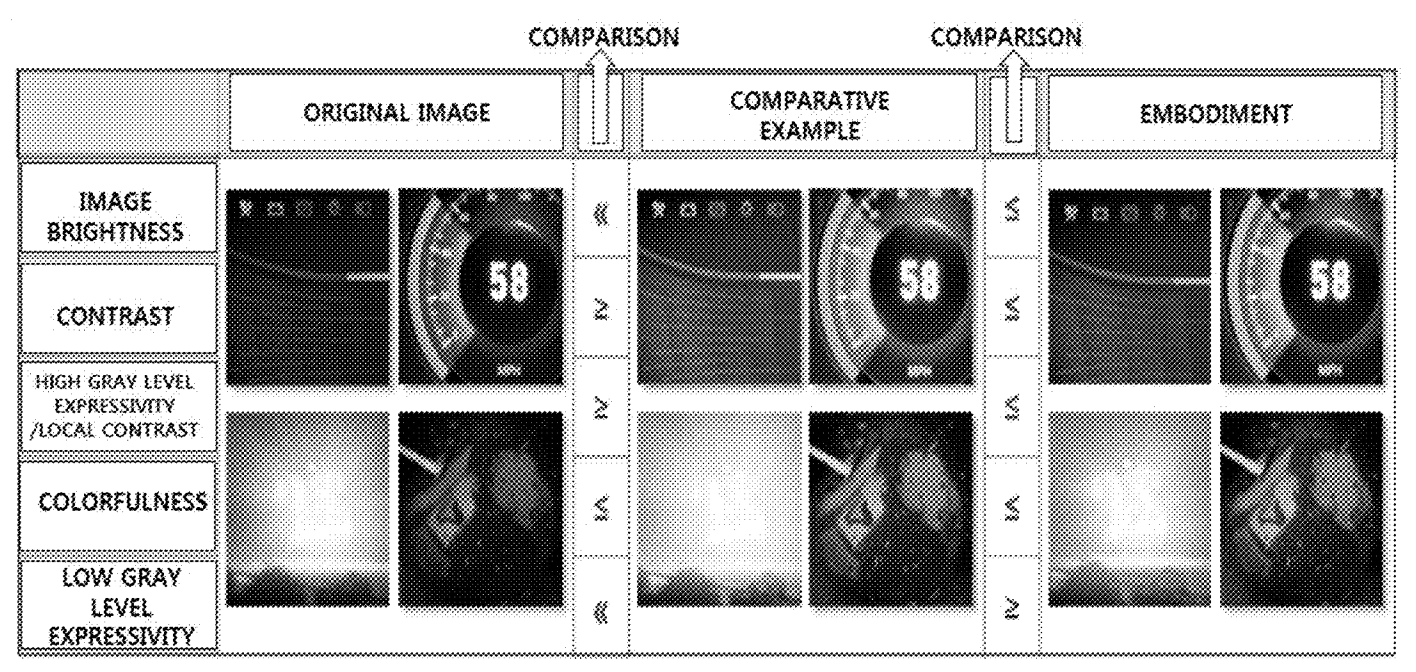

FIG. 17 is a diagram for describing a comparison of an operation before an embodiment is applied and an operation after an embodiment is applied, FIG. 18 is a diagram showing a variation of a gain corresponding to a second average picture level before an embodiment is applied, FIG. 19 is a diagram showing a variation of a gain corresponding to a second average picture level after an embodiment is applied; and FIG. 20 is a diagram showing expressivity in a comparative example and an embodiment after image processing is performed on an original image.

In FIG. 17, part (A) illustrates a second average picture level before an embodiment is applied, and part (B) illustrates a second average picture level after an embodiment is applied. In FIG. 17, only gains corresponding to four periods where a second average picture level is 0, 32, 128, and 255 are illustrated and described.

Referring to FIGS. 18 and 19 in conjunction with FIG. 17, before an embodiment is applied, it may be seen that the second average picture level is set to have a gain value in a direction from a lowest gray level period where the second average picture level is 0, to a highest gray level period where the second average picture level is 255, and an image is implemented based thereon.

On the other hand, after an embodiment is applied, it may be seen that the lowest gray level period where the second average picture level is 0 and the highest gray level period where the second average picture level is 255 are set to have similar gain values or the same gain value and a low gray level period where the second average picture level is 32 and a middle gray level period where the second average picture level is 128 are set to have similar gain values or the same gain value, and based thereon, an image is implemented.

A difference of a gain calculation method described above may denote a difference of each of the brightness, contrast, high gray level expressivity/local contrast, colorfulness, and low gray level expressivity of an image as in the comparative example and an embodiment illustrated in FIG. 20.

As seen in FIG. 20, comparing with an original image, it may be seen that an embodiment shows that low gray level expressivity is slightly reduced or is equal and is better than the brightness, contrast, high gray level expressivity/local contrast, and colorfulness of the other image.

However, in the comparative example (before an embodiment is applied), it may be seen that only the brightness and low gray level expressivity of an image are good, and the contrast and high gray level expressivity/local contrast of the image are slightly bad or equal.

Therefore, in an embodiment, the brightness, contrast, high gray level expressivity/local contrast, and colorfulness of an image may be enhanced to a good level compared to an original image.

As described above, according to the present disclosure, brightness, local contrast, colorfulness, and sharpness may be enhanced by using average picture level information about a local image, and thus, image expressivity (reproducibility) may be improved. Also, according to the present disclosure, an RGB data signal may be converted into a brightness component (Y) and color component (Cb, Cr) data signal without image processing on the RGB data signal, and colorfulness may be enhanced based on color-based optimal saturation improvement technology, thereby increasing image expressivity (reproducibility).

The effects according to the present disclosure are not limited to the above examples, and other various effects may be included in the specification.

While the present disclosure has been particularly shown and described with reference to exemplary embodiments thereof, it will be understood by those of ordinary skill in the art that various changes in form and details may be made therein without departing from the spirit and scope of the present disclosure as defined by the following claims.

What is claimed is:

1. A display apparatus comprising:
    a display panel displaying an image;
    a driver driving the display panel; and
    a controller controlling the driver,
    wherein the controller converts an RGB data signal supplied from the outside into a YCbCr data signal, and performs image processing based on a gain determination graph having a horizontal asymmetric gain value with respect to a reference point, to enhance brightness of the YCbCr data signal,
    wherein the gain determination graph has a gain value which progressively increases as a gray level increases, for enhancing low gray level expressivity and a contrast of an image in 20% or less of an average picture level, and has the gain value which progressively decreases as the gray level increases, for minimizing a collection of high gray levels of an image and enhancing high gray level expressivity in 20% or more of the average picture level.

2. The display apparatus of claim 1, wherein the controller comprises:
    a first converter converting the RGB data signal into the YCbCr data signal; and
    a calculator calculating a brightness component and a color component in the YCbCr data signal and calculating a first average picture level and a second average picture level in the brightness component.

3. The display apparatus of claim 2, wherein the controller comprises:
    a brightness enhancer enhancing brightness of the YCbCr data signal on the basis of the second average picture level; and
    a local contrast enhancer enhancing a local contrast of the YCbCr data signal on the basis of the brightness component and the first average picture level each output from the calculator and the brightness gain output from the brightness enhancer.

4. The display apparatus of claim 3, wherein the controller comprises:
- a colorfulness enhancer enhancing a color component of the YCbCr data signal on the basis of an enhanced brightness component output from the local contrast enhancer and the color component output from the calculator; and
- a second converter combining the enhanced brightness component, output from the local contrast enhancer, with an enhanced color component output from the colorfulness enhancer and converting a YCbCr data signal format into an RGB data signal format to output a converted signal.

5. The display apparatus of claim 2, wherein the controller further comprises an illuminance determiner determining whether external light is higher than preset illuminance, on the basis of a sensing value transferred from an illuminance sensor,
wherein, when the sensing value is greater than or equal to an internal set value, the illuminance determiner operates the first converter.

6. The display apparatus of claim 1, wherein,
the reference point is defined to have a high gain value in a part of a low gray level, and
the horizontal asymmetric gain value is defined to have a lower gain value than the gain value at the reference point.

7. The display apparatus of claim 1, wherein, in the gain determination graph, the gain value for expressing the low gray level is higher than the gain value for expressing the high gray level.

8. The display apparatus of claim 1, wherein,
when brightness of a center pixel is brighter than average brightness of a peripheral pixel in an average brightness component of N×M (where N and M is an integer of 3 or more) pixel blocks corresponding to the YCbCr data signal, the controller increases the brightness of the center pixel to enhance a local contrast of the YCbCr data signal, and
when the brightness of the center pixel is not brighter than the average brightness of the peripheral pixel in the average brightness component, the controller decreases the brightness of the center pixel.

9. The display apparatus of claim 1, wherein the controller varies a weight of each color on the basis that a saturation range for each hue differs, to enhance colorfulness of a color component of the YCbCr data signal.

10. A vehicle display apparatus comprising:
- a display apparatus including a display panel displaying an image, a driver driving the display panel, and a controller controlling the driver; and
- an illuminance sensor sensing external light outside a vehicle,
wherein, when a sensing value transferred from the illuminance sensor is greater than or equal to an internal set value, the controller converts an RGB data signal supplied from the outside into a YCbCr data signal, and performs image processing on the basis of a gain determination graph having a gain value which is horizontally asymmetric with respect to a reference point, for enhancing brightness of the YCbCr data signal,
wherein the gain determination graph has a gain value which progressively increases as a gray level increases to enhance low gray level expressivity and a contrast of an image in 20% or less of an average picture level, and has a gain value which progressively decreases as a gray level increases to minimize a collection of high gray levels of an image and enhance high gray level expressivity in 20% or more of the average picture level.

* * * * *